June 23, 1964 A. H. SIVASLIAN 3,138,035
ANTI-BACKLASH PINION
Filed June 12, 1961

INVENTOR.
ARMEN H. SIVASLIAN
BY
Ernest L. Brown
ATTORNEY

United States Patent Office 3,138,035
Patented June 23, 1964

3,138,035
ANTI-BACKLASH PINION
Armen H. Sivaslian, Whittier, Calif., assignor to
North American Aviation, Inc.
Filed June 12, 1961, Ser. No. 116,321
2 Claims. (Cl. 74—440)

This invention pertains to an anti-backlash pinion and more particularly to an anti-backlash pinion which is adapted to have a minimum diameter.

Prior known anti-backlash gears have relatively large diameters to generate spring forces of sufficient magnitude to maintain the anti-backlash characteristic.

For computer use, or the like, it is frequently necessary to drive a larger gear with a small pinion. With a very small diameter it is impossible to obtain anti-backlash characteristics in the pinion by using the teaching of the prior art.

Prior known anti-backlash gears could be used with a non anti-backlash pinion. However, with the anti-backlash pinion of this device and a non anti-backlash gear a significant reduction in overall space requirement is achieved.

It is therefore an object of this invention to generate an anti-backlash characteristic in a pinion.

It is also an object of this invention to have an anti-backlash gear and pinion combination which uses a minimum of space.

It is a more particular object of this invention to generate an anti-backlash characteristic in a pinion by utilizing a torsion spring positioned along the common axis of a split pinion.

It is still more particular object of this invention to mechanize the above named objects.

Other objects will become apparent from the following description taken in connection with the accompanying drawings in which.

Figures 1, 2, 3, 4:
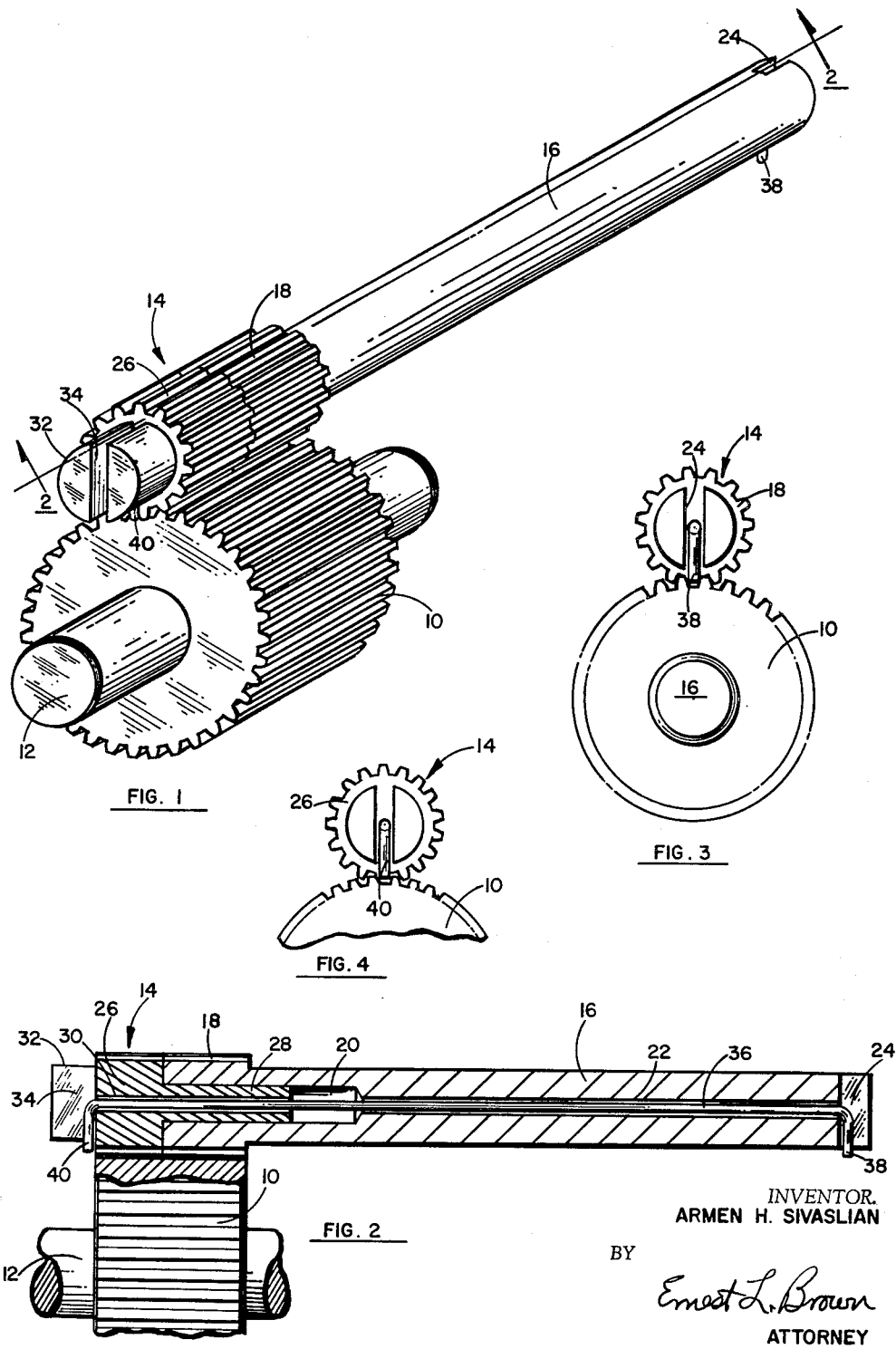
FIG. 1 shows an anti-backlash pinion, in accordance with this invention, engaging a non-anti-backlash gear.
FIG. 2 is a view, partially in section, taken at 2—2 in FIG. 1.
FIG. 3 is a view, taken from the right in FIG. 1.
FIG. 4 is a view taken from the left in FIG. 1.

In the figures, a non-anti-backlash gear 10 is shown positioned upon a shaft 12. Gear 10 engages the anti-backlash pinion 14 of this invention.

Anti-backlash pinion 14 has a first circular cylindrical shaft 16 with a gear 18 positioned on a first end thereof. The axis of gear 18 is coaxial with the axis of shaft 16. A journal bearing 20, shown more particularly in FIG. 2, is formed along the axis of gear 18 and shaft 16. Bearing 20 extends at least part of the way through the thickness of gear 18. A first axial opening 22 in shaft 16 extends from bearing 20 to a second end of shaft 16. Bearing 20 and opening 22 may be, for example, drilled and countersunk into shaft 16 and the hub of gear 18. A first radial notch 24 is positioned on the second end of shaft 16. Notch 24 is shown extending across the diameter of the end of shaft 16. Although such a notch is easier to cut, the notch need only extend from opening 22 part of the way along a radius of shaft 16.

A second gear 26 which has the same outer diameter and pitch as the outer diameter and pitch of gear 18 has a second cylindrical shaft 28 whose outer diameter on one end is slightly less than the inner diameter of bearing 20. Shaft 28 has a sliding fit with bearing 20. The length of shaft 28 must be at least slightly less than the depth of journal bearing 20 to adapt shaft 28 to being rotatable in bearing 20. A second axial opening 30 in shaft 28 and gear 26 extends through the length of shaft 28 and the thickness of gear 26. A second radial notch is positioned on the end 32 of shaft 28. Although end 32 of shaft 28 is shown in the figures to have a larger diameter than it has in the region of journal bearing 20, the diameter is not critical. Slot 34 may preferably be cut into the face of gear 26. It is intended by the recitation in the claims that, "a second radial notch positioned in the end of the second shaft adjacent to second gear and opposite said bearing" include the modification that slot 34, alternatively, may be cut into the face of gear 26.

A torsion spring 36 is inserted into openings 30 and 22 and extends along the length of these openings. Spring 36 is bent over at its ends 38 and 40 into notches 24 and 34, respectively. Torsion spring 36 may, for example, be a torsion wire. Torsion spring 36 is positioned and adapted to hold gears 18 and 26 in coaxial side-by-side position and to bias gears 18 and 26 in opposite directions of rotation.

When the gears 18 and 26 are assembled with gear 10, gear 26 is given a slight rotation relative to gear 18 to flex torsion spring 36 which biases gears 18 and 26 in opposite directions of rotation against the teeth of gear 10.

In operation, at least one of gears 18 or 26 at all times is in contact with the teeth of gear 10. Consequently rotation of one gear is immediately imparted, without backlash, to the other gear.

The device of this invention then generates an anti-backlash characteristic in a pinion which is thereby adapted for use in small spaces, such as in a computer, or the like.

Although the device of this invention has been described in detail above it is not intended that the invention should be limited thereby but only in accordance with the spirit and scope of the appended claims.

I claim:

1. An anti-backlash pinion gear for use in cooperative engagement with another gear comprising: A first circular cylindrical shaft with a gear positioned on a first end thereof whose axis is coaxial with said shaft; a journal bearing formed along the axis of said gear and said shaft extending at least partially through the thickness of said gear; a first axial opening in said shaft extending from said bearing to the second end of said shaft; a first radial notch in the second end of said shaft; a second gear having the same outer diameter and pitch as the outer diameter and pitch of said first gear and having a second cylindrical shaft whose outer diameter is slightly less than the inner diameter of said journal bearing and whose length is slightly less than the depth of said journal bearing to adapt said second shaft to be rotatable in said journal bearing; a second axial opening in said second shaft and gear extending from one end to the other; a second radial notch positioned in the end of said second shaft adjacent to said second gear and opposite said bearing; said second shaft positioned in said bearing; and a torsion spring means positioned along the length of said first and second openings and bent over at opposite ends to engage said first and second notches for holding said gears in coaxial side-by-side position and biasing said gears in opposite directions of rotation, said second radial notch providing means for applying torque to said torsion spring.

2. In combination: A first gear having a first shaft, said first shaft being hollow along its axis and having a journal bearing formed therein in the region of said first gear and further having a notch formed in one end thereof, a second gear having a second shaft, said second shaft being hollow along its axis and having a notch located at one end thereof in the region of said second gear, said notch in the region of said second gear providing means for applying torque to said second gear relative to said first gear, said second shaft being positioned to rotate in said journal bearing; torsion spring means positioned in the notches of said first and second shafts for forcing said gears axially together and for applying anti-backlash torque to one of said gears with respect to the other, and a third gear connected to engage said first and second gears.

References Cited in the file of this patent

UNITED STATES PATENTS

| | | |
|---|---|---|
| 1,197,261 | Burke | Sept. 5, 1916 |
| 1,554,889 | Smyth | Sept. 22, 1925 |
| 2,163,836 | Haas | June 27, 1939 |
| 2,663,198 | Cairnes | Dec. 22, 1953 |
| 2,845,809 | Hetzel | Aug. 5, 1958 |
| 2,868,033 | Gaither | Jan. 13, 1959 |
| 2,966,806 | Luning | Jan. 3, 1961 |

FOREIGN PATENTS

| | | |
|---|---|---|
| 596,082 | Germany | Apr. 26, 1934 |